United States Patent [19]
Wada

[11] 3,908,494
[45] Sept. 30, 1975

[54] CUTTING APPARATUS

[75] Inventor: Mitsuaki Wada, Kawaguchi, Japan

[73] Assignee: Kabushiki Kaisha Suwa Seikosha, Japan

[22] Filed: Mar. 28, 1973

[21] Appl. No.: 345,593

[30] Foreign Application Priority Data
Mar. 28, 1972 Japan.............................. 47-31079

[52] U.S. Cl. .......................... 83/80; 83/156; 83/209; 83/221; 83/262; 83/269
[51] Int. Cl. ............................ B26d 7/06; B26d 5/20
[58] Field of Search ......... 83/79, 80, 156, 209, 221, 83/262, 268, 269

[56] References Cited
UNITED STATES PATENTS

| | | | |
|---|---|---|---|
| 2,546,390 | 3/1951 | Donner | 83/269 X |
| 3,266,354 | 8/1966 | Ortner | 83/221 X |
| 3,329,181 | 7/1967 | Buss et al. | 83/367 X |
| 3,428,302 | 2/1969 | Lotz | 83/156 X |

*Primary Examiner*—Willie G. Abercrombie
*Attorney, Agent, or Firm*—Robert E. Burns; Emmanuel J. Lobato; Bruce L. Adams

[57] ABSTRACT

A cutting apparatus for cutting a length of scrap material into pieces of scrap comprises a pair of rotatable rollers mounted for movement towards and away from each other and which receive therebetween the scrap material. A single-acting fluid motor actuates the rollers into pressure contact and a drive motor rotationally drives the rollers to feed the scrap material along a given path when the rollers are in pressure contact. A cutting device is disposed along the given path at a location downstream from the pair of rollers and cuts the fed scrap material into pieces of scrap.

5 Claims, 7 Drawing Figures

CUTTING APPARATUS

The present invention relates generally to a cutting apparatus and more particularly, to a cutting apparatus for cutting a length of scrap material into short pieces of scrap.

Many industries employ machining apparatus which develop various types of scrap material and therefore some means must be utilized to cut the scrap material into easily transportable sizes so that the scrap material may be recycled or otherwise disposed of. Unfortunately, the cutting apparatus now available for carrying out this function are large and bulky and require a relatively large amount of power input for their operation. Moreover, the prior art cutting apparatus cuts the scrap material into pieces of varying size and it is frequently necessary to cut the scrap into pieces of constant size.

It is therefore a primary object of the present invention to provide a cutting apparatus which is small and compact in size.

It is another object of the present invention to provide a cutting apparatus having means for ensuring that the scrap material is cut into pieces of a constant size.

It is a further object of the present invention to provide a cutting apparatus having means for cutting scrap material into pieces of constant size and which may selectively determine the size of the cut pieces.

It is yet another object of the present invention to provide a cutting apparatus which is electrically controlled to automatically cut a length of scrap material into pieces of scrap.

The above and other objects of the present invention are carried out by a cutting apparatus comprising a pair of pinch rollers mounted for movement towards and away from each other and which receive therebetween a length of scrap material. The pair of rollers are continuously biased apart and a single-acting fluid motor is employed to actuate the rollers into engagement. An electric drive motor is connected to one of the rollers to rotationally drive same to thereby feed the length of scrap material along a given path of travel and a cutting device is disposed along the path for cutting the length of scrap material into pieces of scrap. A movable guide plate is disposed downstream from the cutting device and abuts against the leading edge of the length of scrap material advanced by the pair of rollers to thereby temporarily limit the movement of the scrap material so that the material is cut into pieces of scrap having the desired length.

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts of the various views, and wherein.

One embodiment of the cutting apparatus will now be described with reference to FIGS. 1–5. The apparatus comprises a table T having mounted thereon a frame plate 1. A frame assembly 2 is attached to the frame plate 1 by means of screws 3 and the frame assembly 2 extends transversely across the path of travel of the scrap material Y which is to be cut. The scrap material Y comprises a continuous band of material, such as delivered from a press machine, and the material may have any cross-sectional configuration or any length.

Figure 2:
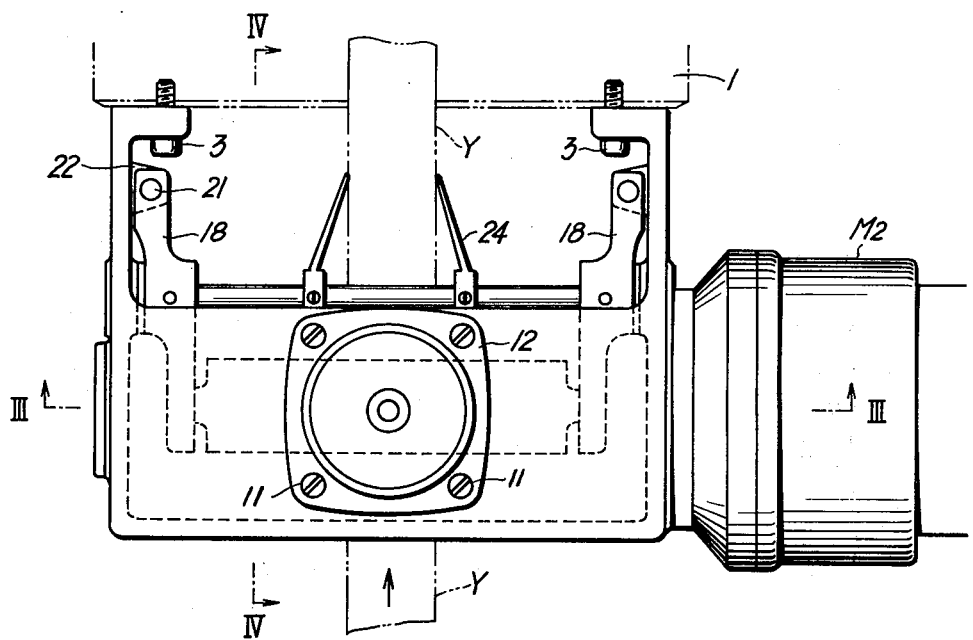
FIG. 2 is a fragmentary plan view of the apparatus shown in FIG. 1.
Figure 3:
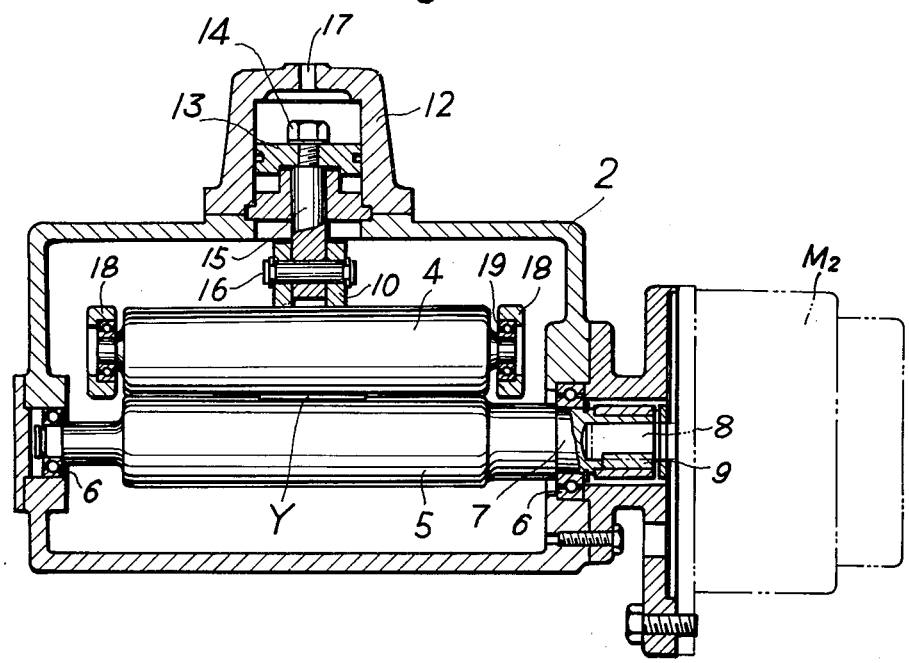
FIG. 3 is a cross-sectional view taken along line III—III in FIG. 2.

The frame assembly 2 is best seen in FIGS. 2–3 and comprises a casing for housing therein a set of pinch rollers 4, 5. The set of pinch rollers comprises a driven pinch roller 4 and a driving pinch roller 5 mounted within the casing in parallel relationship with respect to each other. The driving roller 5 is supported at each end by a roller bearing 6 mounted in the frame assembly 2 and one end 7 of the roller 5 is keyed to an output shaft 8 of a drive motor M2 by means of a key 9. The drive motor M2 comprises a three-phase electric motor which will be described in more detail hereinafter.

The driven roller 4 is mounted for movement towards and away from the driving roller 5 to effect pressure contact between the two rollers. A fluid actuator is provided for actuating the driven roller 4 into contact with the driving roller 5, and biasing means is provided for continuously biasing the roller 4 out of contact with the roller 5.

The fluid actuator comprises a pair of rollers 10, 10 rotatably mounted upon a common shaft 16 and the shaft is connected to one end of a connecting rod 15. The other end of the connecting rod 15 is connected to a piston 13 by means of screw threads provided on the rod and a lock nut 14. The piston 13 is slidably mounted within a fluid cylinder 12 which is affixed to the frame assembly 2 by means of screws 11. A fluid inlet-and-outlet port 17 extends through one end wall of the cylinder 12 for supplying and exhausting motive fluid into and out of the cylinder to actuate the piston. The fluid actuator comprises a single-acting fluid motor responsive to motive fluid supplied thereto for actuating the driven pinch roller 4 towards the driving pinch roller 5 through the intermediary of the rollers 10 and enables the roller 4 to be moved away from the roller 5 by the biasing means when the motive fluid is exhausted from the motor.

Figure 4:
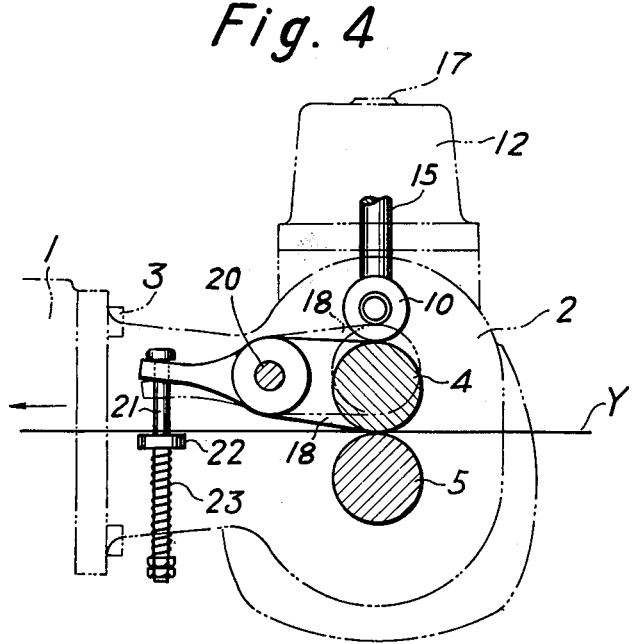
FIG. 4 is a cross-sectional view taken along line IV—IV in FIG. 2.

The mounting means for mounting the driven pinch roller 4 is best seen in FIGS. 3 and 4, and such comprises a pair of juxtaposed supporting arms or levers 18 each connected at one end through a ball bearing 19 to an end of the drive pinch roller 4. The other ends of the supporting arms 18 are pivotally mounted about a shaft 20 and by such a construction, the arms 18, 18 may pivot about the shaft 20 to effect movement of the pinch roller 4 relative to the pinch roller 5.

The biasing means comprises a pair of slide bolts 21, 21 each mounted for sliding movement through a guide ring 22 which is rigidly connected to the frame assembly 2. The slide bolts 21 each extend through slots provided in the endmost portions of the supporting arms 18. The slide bolts each have at one end a head for preventing the bolts from falling through the slots in the supporting arms and have at the other end screw threads. A helical compression spring 23 is disposed around the lower portion of the slide bolts 21 and is maintained in a compressed state between the guide rings 22 and a pair of nuts threaded onto the screws threads. By this arrangement, the biasing springs 23 urge the slide bolts 21 downwardly thereby biasing the supporting arms 18 upwardly to accordingly bias the pinch roller 4 in a direction away from the pinch roller 5. It is understood that the force applied to the pinch roller 4 by the fluid actuator is sufficient to overcome the biasing force exerted by the biasing means to accordingly pivot the supporting arms 18 downwardly against the biasing force to thereby move the pinch roller 4 into contact with the pinch roller 5.

Turning again to FIGS. 1 and 2, the guiding means are provided for guiding the scrap material between the pinch rollers 4, 5 and into a cutting device 26. The guiding means comprises a pair of guide arms 24 adjustably positioned along a guide bar which is affixed to the frame assembly 2. The guide arms 24 are each slidably mounted along the guide bar and are releasably engaged therewith by means of a set screw and the guide arms have end portions which slidably engage with the scrap material Y to effectively guide the material therebetween. The guiding means further comprises an arcuate guide plate 25 disposed downstream from the guide arms 24 and the guide plate 25 forms an abutment surface for the scrap material and guides the material downwardly towards the cutting device 26. The cutting device 26 cuts or shears the scrap material into scrap segments y which fall by gravity into a receptacle 37. The receptacle 37 is disposed between a pair of supporting members 38 which are connected to and support the weight of the table T.

Figure 1:
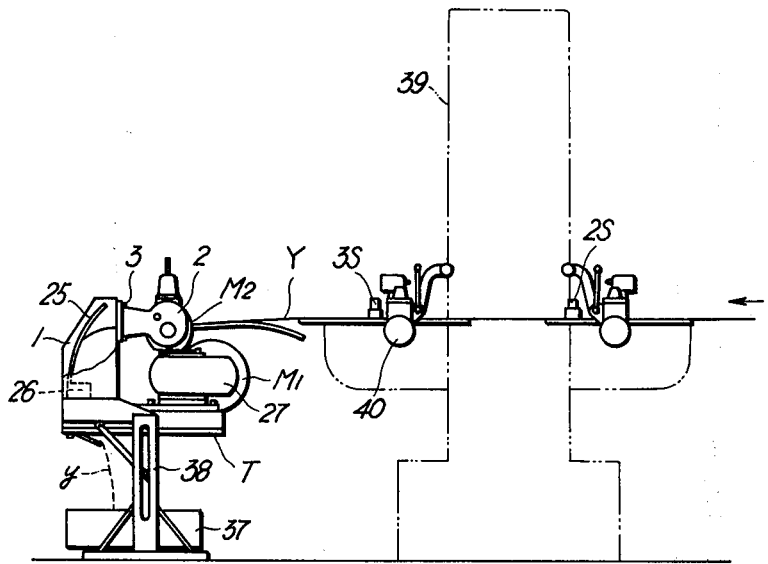
FIG. 1 is a side elevational view of one embodiment of apparatus constructed in accordance with the principles of the present invention.
Figure 5:
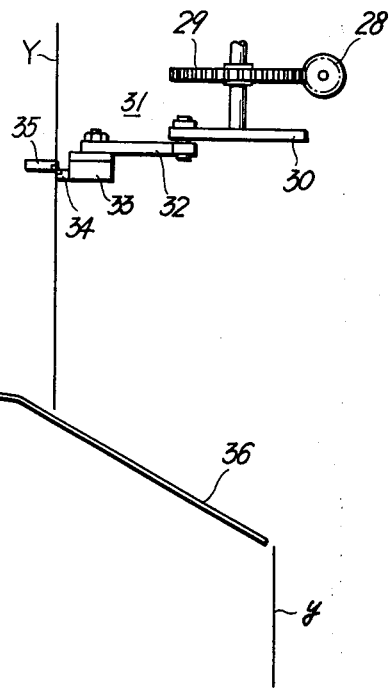
FIG. 5 is a schematic view of the cutter mechanism forming part of the apparatus of the present invention.

The cutting device 26 will now be described with reference to FIGS. 1 and 5. The cutting device 26 comprises a cutter drive motor M1 mounted on the top of the table T and the motor rotationally drives a worm gear 28 through a gear reduction device 27. The gear reduction device 27 is of well-known construction and functions to convert the high rotational speed of the drive motor M1 into a relatively low rotational speed of the worm gear 28. As seen in FIG. 5, the worm gear 28 meshes with a worm wheel 29 and the output motion of the worm wheel 29 is transmitted through a shaft to rotationally drive a disc 30.

A sliding crank mechanism 31 is eccentrically connected to the disc 30 and the sliding crank mechanism comprises a reciprocal crank shaft 32 connected to a support body 33 whereby rotary movement of the disc 30 effects reciprocal movement of the support body 33. A mobile cutting blade 34 is connected to the support body 33 for movement therewith and the mobile cutting blade 34 coacts with a stationary or immobile cutting blade 35 to perform a cutting or shearing operation. During operation of the apparatus, the scrap material Y is advanced between the cutting blades 34 and 35 which are repeatedly opened and closed to cut the scrap material by a shearing action into a series of short scrap segments y.

Means are also provided for regulating the length of the pieces of scrap cut by the cutting device 26 and this is shown in FIG. 5. The means comprises a cutting length regulating guide plate 36 disposed downstream from the cutting blades 34, 35 and disposed along the path of travel of the scrap material Y. The guide plate 36 has a sloped portion extending generally transverse to the path of travel of the scrap material and the guide plate is mounted for movement relative to the cutting device. By such an arrangement, the guide plate 36 may be moved towards and away from the cutting blades or may be moved leftwardly or rightwardly to thereby selectively change the distance between the cutting blades and the point where the scrap material contacts the guide plate to thereby determine the length of the cut segments. As the material is advanced between the cutting blades, the material abuts against the guide plate 36 and is prevented from moving further and by this coaction, the guide plate 36 effectively determines the lengths of the cut scrap segments y.

Figure 6:
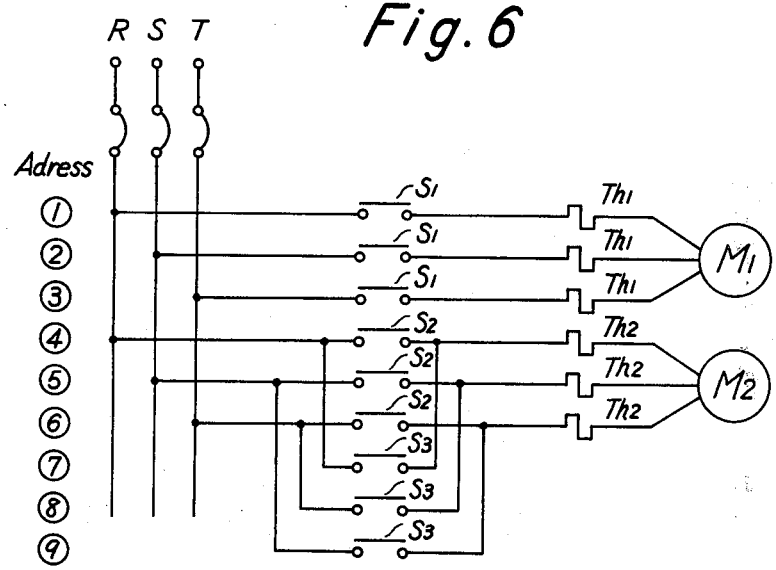
FIG. 6 is a wiring schematic of a portion of the electric circuitry used in controlling the apparatus.
Figure 7:
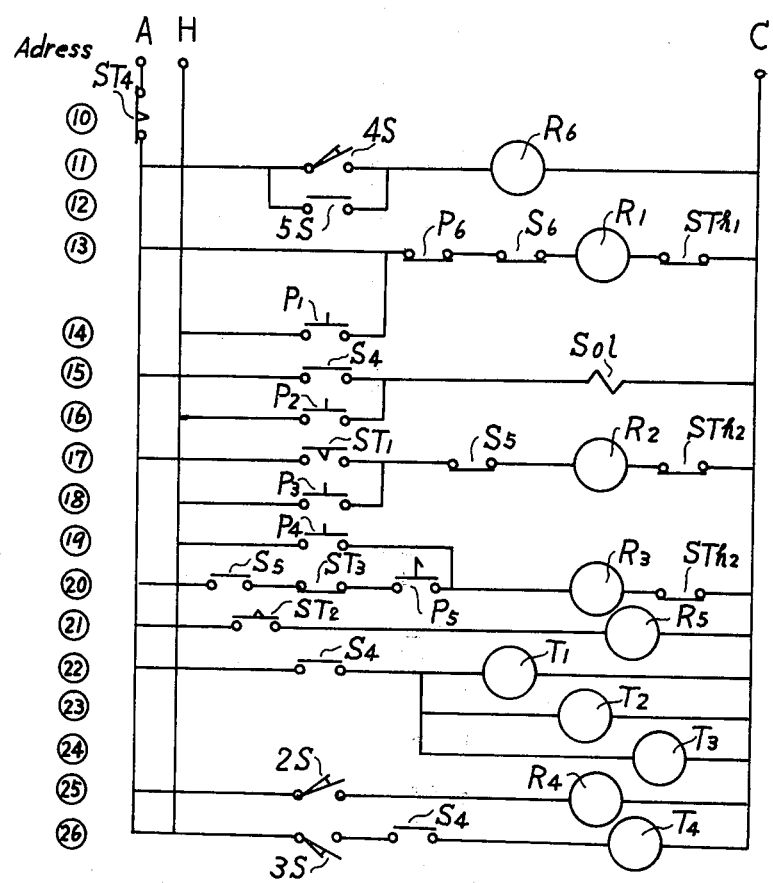
FIG. 7 is a wiring schematic of the remaining portion of the electric circuitry.

Now the operation of the cutting apparatus will be described with reference to the circuit diagrams shown in FIGS. 6 and 7 and with reference to the address line numbers 1 to 26 given at the left sides of the drawings.

During the manual mode of operation, voltage is applied across the terminals H and C. The terminals R, S, T represent power source terminals of the three-phase current drive motors M1 and M2. When the self-retaining push switch P1 on line 14 is pushed, a relay R1 on line 13 works to close the switches S1 on lines 1, 2, 3, and the cutter drive motor M1 begins to rotate. Then the self-retaining push switch P2 on line 16 is pushed to energize the solenoid SOL on line 15 to actuate a directional valve for the cylinder 12 to supply motive fluid into the cylinder to actuate the piston 13 to close the gap between the pinch rollers 4, 5. When the self-retaining select switch P3 on line 18 is turned on, a relay R2 on line 17 is energized to close the switches S2 on lines 4, 5, 6 so that the drive motor M2 starts rotation.

When the scrap material Y is inserted between the pinch rollers 4, 5, it is drawn by the rotation of the pinch rollers and cut into pieces by the cutting device 26. When the scrap material Y must be drawing back from between the pinch rollers 4, 5, the switch P4 on line 19 is turned on so that the relay R3 on line 20 is energized to turn on the switches S3 on lines 7, 8, 9 and the cutter drive motor M2 rotates in the reverse direction. Thus the scrap material which is pinched between the pinched rollers 4, 5 is drawn back by the reverse rotation of the pinch roller 5.

One automatic mode of operation will now be explained considering first the case wherein the scrap material discharged from the press machine 39 is not drawn between the pinch rollers 4, 5.

A control switch (not shown) is actuated to place the system in the automatic mode whereby voltage is applied across the terminals A and C. As current flows through line 13, the relay R1 is energized to turn on the switches S1 on lines 1, 2, 3 and the cutter drive M1 starts its rotation. When the material Y is charged into the press machine 39 for a pressing operation, limit switches 2S, 3S are both in the OFF state and accordingly the switches 2S, 3S on lines 25, 26 in FIG. 7 are also in the OFF state whereby neither the relay R4 on line 25 nor the timer T4 on line 26 are energized. After the pressing operation, the scrap material Y is discharged from the press machine 39 by feed means 40 and the scrap material passes unencumbered between the pinch rollers 4, 5 which are biased apart at this time. The scrap material Y is guided by the guiding means to the cutting device by the inertia of the scrap material forcibly projected cut by the cutting device 26.

When the trailing end of the scrap material Y coming into the press machine 39 passes by the limit switch 2S, the press machine stops and at the same time, the feed means 40 opens to turn on the switch 2S on line 25 and energize the relay R4 so that the switches S4 on line 15, 22, 26 close. Thus the solenoid SOL on line 15 is energized to actuate the fluid actuator, to close the gap between the pinch rollers 4, 5 thus actuating the timers T1, T2, T3 on lines 22, 23, 24. The timer T1 works so as to turn on the switch ST1 on line 17 after $t1$ sec. to thereby actuate the relay R2. Then the switches S2 on lines 4, 5, 6 turn on to energize the drive motor M2 which commences rotation in the forward direction.

During this mode of operation, the scrap material Y is transferred to the cutting device 26 not by the discharge projection power of the press machine but by the drawing power of the pinch rollers 4, 5 the material is continually cut into scrap pieces $y$. Subsequently, when the trailing end of the scrap material Y is discharged from the press machine 39, the limit switch 3S turns on. As the switch 3S on line 26 is closed and the switch S4 has been closed by the relay R4, the timer T4 starts working. The timer T2 operates so as to turn on the switch ST2 on the line 21 after $t2$ sec. and the time period $t2$ sec. is preset so as to be long enough for the trailing end of the scrap material to have passed the pinch rollers 4, 5 and the turning on of the switch ST2 actuates the relay R5. In this manner, the switch S5 on line 17 turns off, while the switch S5 on line 20 turns on to open the relay R2. Therefore, the switches S5 on lines 4, 5, 6 turns off to stop the rotation of the drive motor M2.

When the next strip of scrap material Y is supplied to the press machine 39, the limit switch 2S turns off and the sequence of operations similar to those described above are repeated in the same order.

Another automatic mode of operation will now be explained considering the case wherein the scrap material discharged from the press machine 39 has at its trailing end a portion incapable of being inserted between the pinch roller 4, 5.

The control switch (not shown) is actuated to place the system in the automatic mode whereby voltage is applied across the terminals A, C and then the push button switch P5 on line 20 is turned on. In a manner similar to the above-mentioned automatic mode of operation, current flows through the line 13 and the relay R1 is energized to energize the cutter drive motor M1. Subsequent steps proceed similarly to the above-mentioned automatic mode of operation and thus the scrap material Y is continually cut down into short segments $y$. When the trailing end of the scrap material Y passes through the press machine 39, then the limit switch 3S is turned on to close the switch 3S on line 26 and actuate the timer T4.

The timer T4 operates to turn on the switch ST2 on line 21 after $t2'$ sec. and this time period is preset to expire immediately before the trailing end of the scrap material enters between the pinch rollers 4, 5, and naturally this time period is shorter than the period $t2$ sec. The closing of the switch ST2 energizes the relay R5 whereby the switch S5 on line 17 is turned off to interrupt the relay R2 and then the switches S2 on lines 4, 5, 6 are also interrupted to stop the drive motor M2. In this manner, since the drive motor M2 stops before the trailing end of the scrap material Y has passed between the pinch rollers 4, 5 any vertical projections such as burrs and the like formed on the trailing end of the scrap material will not scratch or otherwise damage the pinch rollers.

The switch S5 on line 20 is simultaneously turned on with the switch S5 on line 17 since the switch P5 has already been closed the relay R3 is energized. Then the switches S3 on lines 7, 8, 9 are closed, and the drive motor M2 starts rotating in the reverse direction to draw the remaining scrap material backwards. The timer T3 on line 24 operates to turn off the switch ST3 after $t3$ sec. and the relay R3 is interrupted whereupon the switches S3 on lines 7, 8, 9 are opened and the drive motor M2 is deenergized and stops rotating the reverse direction.

When the next strip of material Y is charged into the press machine 39, the limit switch 2S is again turned off and the above-mentioned sequent of operations are repeated. It should be noted that regardless of which automatic mode of operation is utilized, the limit switches 2S, 3S remain in the "ON" position till the material Y is charged into the press machine 39. Therefore the relay R4 is energized and the switch S4 on line 26 is closed to actuate the timer T4. The switch ST4 on line 10 is turned off in $t4$ sec. after the switch 3S is turned on to thereby interrupt the automatic mode of operation. When new material Y is charged into the press machine 39 within $t4$ sec., the limit switch 2S is turned off to interrupt the relay R4 and then the switch S4 on line 26 is opened to interrupt the timer T4. Thus, even when $t4$ sec. have elapsed before the switch 3S is turned off, the timer T4 does not work.

As regards other operations of the cutting apparatus, when the push button switch P6 on line 13 is pushed to be turned off, the relay R1 is interrupted to turn off the switches S1 on lines 1, 2, 3 and to stop the cutter drive motor M1. A trouble-detecting relay R6 on line 11 is energized when the limit switch 4S is turned on due to either a material feeding error or when the switch 5S is turned on due to a defective discharge of the press work products. In this case, the relay R6 works to turn off the switch S6 on line 13, interrupt the relay R1, and turn off the switches S1 on lines 1, 2, 3 to stop the cutter drive motor M1. Furthermore, in the case either of the drive motors M1, M2 is overloaded, a set of thermal relays Th2 on lines 4, 5, 6 work to turn off the switch STh1 or the switches STh2 on lines 17, 20 and interrupt the relays R1, R2, R3 so as to turn off respective switches S1, S2, S3 and thereby stop the drive motors M1, M2.

As described hereinbefore, the cutting apparatus of the present invention effects the cutting of plates, strips or bands up to the extreme trailing end thereof because the pinch rollers 4, 5 pinch the material to feed same to the cutting device when the material becomes shorter than a certain length. Furthermore, a cutting length regulating guide plate 36 is adjustably positionable beneath the cutting device 2b for controlling the length of the cut pieces of scrap up till reaching the very trailing end of the scrap material. Moreover, when projections and undesirable rises are formed on the scrap material during the pressing operation, the pinch rollers 4, 5 may be reversely rotated to discharge the scrap material thereby preventing damage to the apparatus.

What I claim is:

1. A cutting apparatus for cutting a length of scrap material into pieces of scrap comprising: means receptive of a length of scrap material during use of the apparatus for feeding the scrap material along a given path, said means including a pair of rotatable rollers respectively disposed on opposite sides of said given path, mounting means mounting said pair of rollers for movement into and out of engagement with the scrap material, fluid motor means for actuating said pair of rollers into engagement with the scrap material, means for resiliently biasing said pair of rollers out of engagement with the scrap material, and drive motor means for rotationally driving said pair of rollers to effect feeding of the scrap material along said given path when said pair of rollers are in engagement with the scrap material and having means responsive to an output signal for terminating the rotational driving of said pair of rollers; cutting means disposed along said given path at a location downstream from said pair of rollers for cutting the fed scrap material into pieces of scrap; detecting means for detecting when the length of material to be fed to said cutting means is less than a certain value and developing said output signal and applying it to said drive motor means to terminate rotational driving of said pair of rollers thereby terminating the feeding of the scrap material which then remains engaged between said pair of rollers; and control means for controlling the operation of said motor means.

2. A cutting apparatus according to claim 1 wherein the control means includes means disposed downstream from said cutting means and coacting with said cutting means for adjustably determining the length of the cut pieces of scrap.

3. A cutting apparatus according to claim 1; wherein said drive motor means includes means for rotationally driving said pair of rollers in the reverse direction to withdraw a remaining length of scrap material from said cutting means.

4. A cutting apparatus according to claim 3; wherein said control means includes a timer mechanism responsive to said output signal and coacting with said drive motor means for automatically effecting rotational driving of said pair of rollers in the reverse direction after a predetermined time period commencing when said detecting means detects that the remaining length of material is less than said certain value.

5. A cutting apparatus according to claim 1; wherein said fluid motor comprises a single-acting reciprocatory motor.

* * * * *

UNITED STATES PATENT OFFICE
CERTIFICATE OF CORRECTION

PATENT NO. : 3,908,494
DATED : September 30, 1975
INVENTOR(S) : Mitsuaki WADA

It is certified that error appears in the above-identified patent and that said Letters Patent are hereby corrected as shown below:

In the Heading, Item [73] Assignee:

delete "Kabushiki Kaisha Suwa Seikosha" and insert

--Kabushiki Kaisha Seikosha--.

Signed and Sealed this twenty-second Day of June 1976

[SEAL]

Attest:

RUTH C. MASON
*Attesting Officer*

C. MARSHALL DANN
*Commissioner of Patents and Trademarks*